(12) United States Patent
Stieh et al.

(10) Patent No.: US 6,398,140 B1
(45) Date of Patent: Jun. 4, 2002

(54) TRUCK MOUNTED CHIPPER VEHICLE

(76) Inventors: William H. Stieh; Kimberly Krysko-Stieh, both of 9301 123rd Way, Seminole, FL (US) 33772

(*) Notice: Subject to any disclaimer, the term of this patent is extended or adjusted under 35 U.S.C. 154(b) by 43 days.

(21) Appl. No.: 09/676,272

(22) Filed: Sep. 28, 2000

(51) Int. Cl.⁷ ............................................... B02C 21/02
(52) U.S. Cl. ............................................... 241/101.741
(58) Field of Search ........................ 241/92, 101.74, 241/101.741

(56) References Cited

U.S. PATENT DOCUMENTS

| | | |
|---|---|---|
| 2,853,240 A | 9/1958 | Mahoney, Jr. |
| 3,913,850 A | 10/1975 | Daniel |
| 4,044,525 A | 8/1977 | Forsgren |
| 4,062,498 A | 12/1977 | Szepaniak |
| 4,254,874 A | 3/1981 | Arnoldsson et al. |
| 4,763,846 A | 8/1988 | High, Jr. et al. |
| 4,786,003 A | 11/1988 | Johnson |
| 4,961,539 A | 10/1990 | Deem |
| 5,226,757 A | 7/1993 | Tarrant |
| 5,395,061 A | 3/1995 | Merklinger |
| 5,457,271 A | 10/1995 | Aulson |
| 5,676,320 A | 10/1997 | Merklinger |

*Primary Examiner*—Mark Rosenbaum
(74) *Attorney, Agent, or Firm*—Dennis G. LaPointe; Mason & Associates, PA

(57) ABSTRACT

A mobile unitary highway chipper truck vehicle useful in the green industry is disclosed. The unitary vehicle of the present invention includes a mounted chipper, a dump bed portion, ample storage compartments, and a cherry picker. The mobile unitary highway chipper truck of the present invention may optionally be fitted with numerous other tree trimming and lawn care accessories.

8 Claims, 9 Drawing Sheets

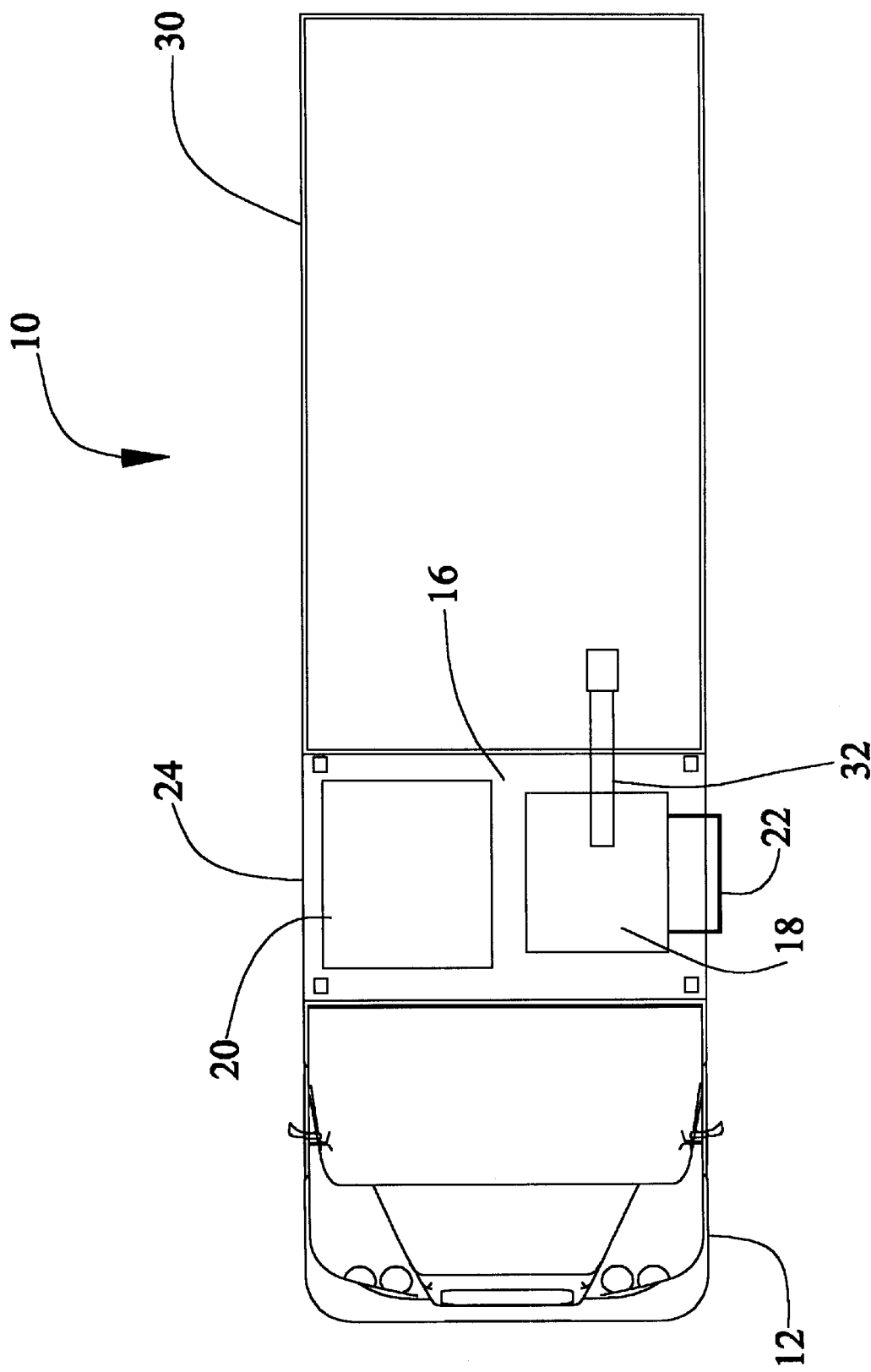

TRUCK MOUNTED CHIPPER VEHICLE

BACKGROUND OF THE INVENTION

1. Field of the Invention

This invention relates, generally, to a mobile unitary highway chipper truck vehicle useful in all aspects of the green industry, including tree trimming and lawn care. More particularly, it relates to a unitized dump truck having a mounted chipper, a dump bed portion, ample storage compartments, and a hydraulic telescoping personnel lift with bucket, commonly referred to as a cherry picker. The mobile unitary highway chipper truck of the present invention may optionally be fitted with numerous other tree trimming and lawn care accessories.

2. Description of Related Art

The equipment presently used in the green industry including tree trimming and lawn care is limited in its utility by its overly cumbersome design, which severely limits its maneuverability and mobility. Generally, the most commonly used machinery consists of a large heavy-duty truck and a separately trailered chipper/shredder device. These units are inefficient and costly to maintain and operate. In addition, these units generally require more than one operator to be attendant at all times, which increases man hour costs.

Vehicles have been developed for the collection and processing of solid waste materials. For example, U.S. Pat. Nos. 5,395,061 and 5,427,271 to Merklinger disclose tire shredders. In particular, the Merklinger patents disclose a truck-mounted shredder that is fed from the side. The shredder is powered by a power takeoff. The tires are dumped into the shredder by means of a conveyor. Discharge from the shredder is dumped into a compactor. The compactor is actuated and the discharge is compacted by means of a screw conveyor into a storage container.

U.S. Pat. No. 4,961,539 to Deem discloses a truck mounted chipper for use in recycling wood pallets; a storage bin is trailered behind the mounted chipper device. The wood pallets are fed up the side over the top of the chipper by means of the conveyor belt. The chips are then blown into the trailered storage bin.

U.S. Pat. No. 4,044,525 to Ferguson discloses a truck mounted tree shredder with a crane and a side feed mechanism. The shredder blows the chips into a large storage bag, which is resting on a flatbed truck chassis trailered behind the tree shredder. The storage bag on the chassis can be tilt dumped.

Unfortunately, all of these chipper/shredder units remain inefficient, cumbersome, and costly to maintain and operate. What is needed then is a compact apparatus having all the necessary tree and lawn care equipment in one unitary vehicle of such a size that it can travel off-road. Additionally, what is needed is a unitary vehicle that is less expensive to purchase, maintain and operate. In view of the prior art at the time the present invention was made, it was not obvious to those of ordinary skill in the pertinent art how the needed unitary highway chipper truck vehicle could be provided.

SUMMARY OF THE INVENTION

In accordance with the present invention, a mobile unitary highway chipper truck vehicle comprising a forwardly pivotable cab portion; an extended chassis; a compartment portion of a predetermined width, height, and length located behind the cab portion on the extended chassis is disclosed. The compartment portion is a space, which includes a working compartment portion and a storage compartment portion. The working compartment portion and the storage compartment portion are located adjacent to each other in either a side by side or back-to-back relationship. A chipping apparatus is housed in the working compartment portion of the compartment portion space. A frame structure is positioned over the compartment portion space and includes a platform. The platform is positioned above the working compartment and the storage compartment portions. A cherry picker is centrally positioned on the platform. Further, a backwardly pivotable dump bed portion is located behind the compartment portion space on the extended chassis. Alternatively, the cherry picker is positioned on the dump bed portion. The vehicle also includes means for discharging materials from the chipper apparatus into the backwardly pivotable dump bed portion. In addition, at least one storage box is located under the extended chassis of the present invention.

In an alternative embodiment, the present invention further includes a means for directionally discharging chipped wood materials from the backwardly pivotable dump bed portion of the unitary apparatus.

In another embodiment, the present invention further includes a means for directionally discharging materials directly from the chipper apparatus itself, thereby circumventing the backwardly pivotable dump bed portion of the present invention.

In yet another embodiment the present invention further includes a means for removing debris and discharging the debris into the backwardly pivotable dump bed portion.

The invention accordingly comprises the features of construction, combination or elements and arrangement of parts that will be exemplified in the construction hereinafter set forth, and the scope of the invention will be indicated in the claims.

BRIEF DESCRIPTION OF THE DRAWINGS

For a fuller understanding of the nature of the invention, reference should be made to the following detailed description, taken in connection with the accompanying drawings, in which:

FIG. 9 is a top cross sectional view of FIG. 2 along line 9—9.

DETAILED DESCRIPTION OF THE INVENTION

Figure 1:
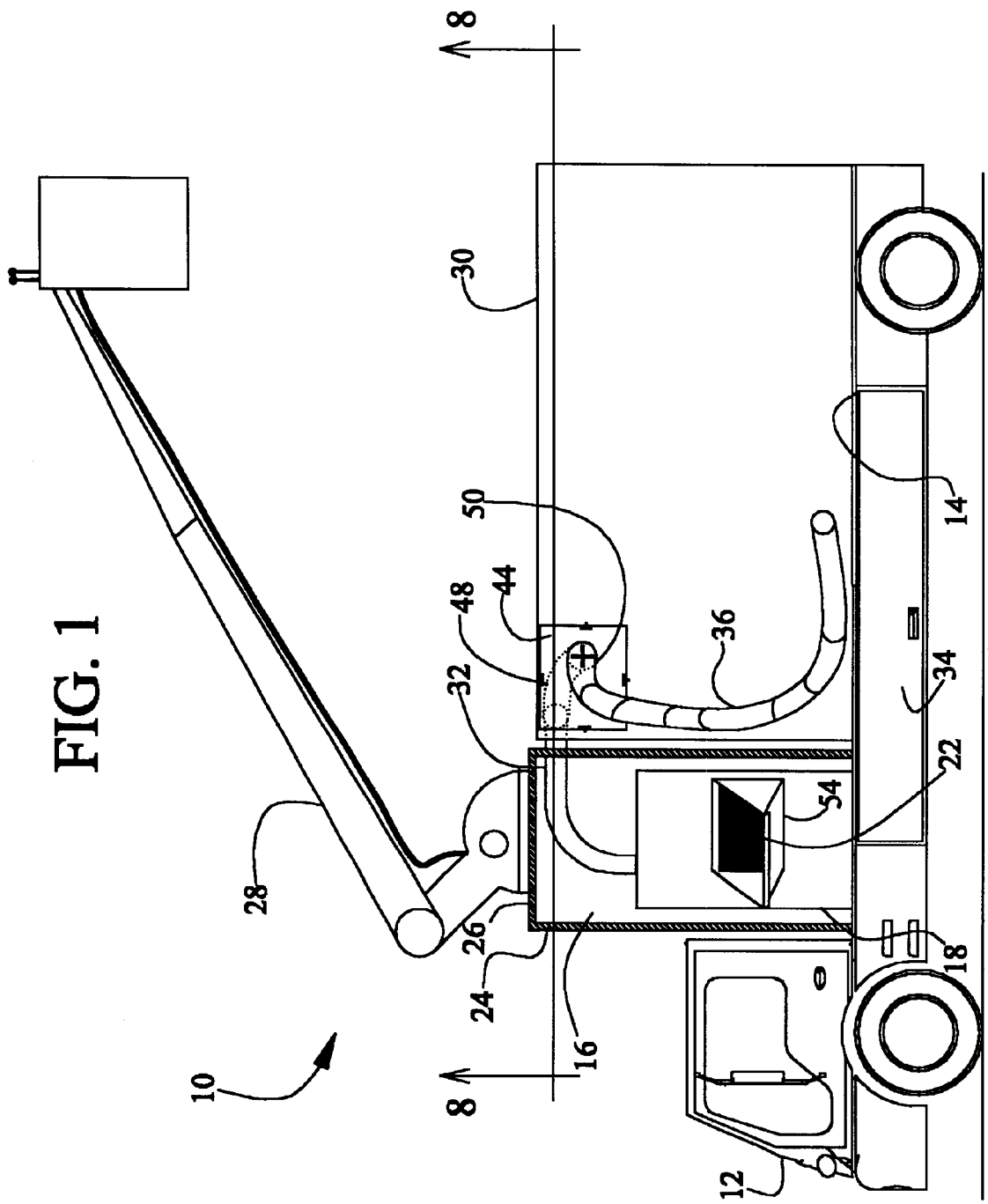
FIG. 1 is a side elevation of one embodiment of the mobile unitary highway chipper truck vehicle of the present invention.

Referring now to the drawings, in which like numerals refer to like elements thereof, FIG. 1, shows an embodiment of the invention which is denoted as a whole by the reference numeral 10.

As shown in FIG. 1, the mobile unitary highway chipper truck vehicle 10, includes a standard forwardly pivotable cab portion 12 and an extended chassis 14. Trucks having a suitable cab portion 12 and an extended chassis 14 are readily available from such sources as Mitsubishi Fuso Truck of America, Inc., Isuzu, Mack and International, to name a few. A compartment portion 16 is located behind the cab portion 12 on the extended chassis 14. The compartment portion 16 is a space of a predetermined width, height, and length. As is readily determinable by those skilled in the art, the width, height and length of the compartment portion 16 space will depend upon the chipper apparatus 22 housed in the working compartment portion 18 and the storage requirements necessary for storage compartment portion 20. The working compartment portion 18 and the storage compartment portion 20 are located adjacent to one another in either a side by side or a back-to-back relationship. Alternatively, storage compartment portion 20 may be used for additional passenger seating. The compartment portion 16, as well as the working compartment 18 and the storage compartment 20 can be readily fabricated by those skilled in the art. Alternatively, compartments useful in the present invention may be commercially available from sources such as Mitsubishi Fuso Truck of America, Inc., Isuzu, Mack, Alumne and International.

A chipping apparatus 22 is housed in the working compartment portion 18 of compartment portion space 16. The working compartment portion 18 is equipped with easily removable panels (not shown) for easy access to the chipper apparatus 22. Access to the chipper apparatus 22 is further accomplished when the forwardly pivotable cab portion 12 is tilted in the forward direction and a backwardly pivotable dump bed portion 30 is tilted in the upright and backward position. Chipping apparatuses useful in the present invention are commercially available from manufacturers such as Bear Cat Company, Vermeer, Toro and Gravely International. As is known in the art, the chipping apparatus may have a manual or hydraulic feed mechanism. Further, in one embodiment, the chipping apparatus may have a self-contained gasoline or diesel engine.

Alternatively, the truck engine may be used to power the truck vehicle and as a power source for the chipper apparatus 22, the cherry picker 28, the dump bed portion 30, and various cutting and pruning tools (not shown) by means of a hydraulic belt driven pump mechanism known in the art. A single drive means, the truck engine, is used to selectively operate the truck 10 and the chipping apparatus 22, the cherry picker 28, the dump bed portion 30, and various cutting and pruning tools (not shown) by means of a hydraulic belt driven pump mechanism known in the art.

Turning now to the chipper apparatus 22, in this embodiment, the chipper apparatus 22 is mounted on the chassis 14 so that the rotor shaft chipping device is in parallel alignment with the axis of the truck drive shaft, i.e., longitudinal with respect to the length of the truck. Because of the large torsional stress and strain produced by the chipping apparatus 22 during operation, it is connected to the truck engine by means of a hydraulic belt driven pump mechanism or other coupling means, known in the art, so as to minimize torsional stress and strain on the truck engine and transmission.

As is known in the art, in order to minimize the stress and strain transmitted by the grinding of waste wood in the chipper 22 to the truck engine and transmission, a number of conventional devices are placed between the chipper 22 and the truck engine. One such device (not shown) is a large and substantial flywheel mounted on the rotor, drive shaft, of the chipping apparatus 22. A second device (not shown) is a known coupling device placed between the truck engine drive and the chipper drive shaft. Such a coupling device can be a dry fluid coupling means in which the shocks and stress of the chipping apparatus 22 are not passed back to the transmission and engine of the truck. In such a dry fluid coupling means, coupling takes place as a result of centrifugal force driving a dry fluid such as metal shot to an outward position so as to lock the vanes of the output shaft with the input shaft. In order to obtain optimal efficiency from such a dry fluid coupling means, it is essential that the rotational speed of the input shaft, i.e., truck motor drive shaft be held to a constant value. As such, the rotational speed of the truck is controlled with a governor, preferably an electronic governor (not shown).

Typically, as is known in the art, the engine for driving both the chipper and the truck itself is a heavy-duty truck type diesel engine. A heavy-duty transmission is also provided for varying the speed and torque of the output shaft from the transmission so as to provide the truck with the normal range of highway operating speeds. A takeoff device is used to selectively connect the transmission output shaft to the truck drive means, that is, the truck wheels, or to the drive shaft of the chipper device 22. When the transmission output is connected to the chipper device 22, such connection takes place through a known torsional stress and strain reducing apparatus such as the dry fluid coupling device previously mentioned. Other types of belt driven hydraulic pumps and coupling devices known in the art or more than one belt driven hydraulic pump or coupling device may also be used in the present invention.

As is known in the art, to further provide for the torque requirements of the truck and the chipper 22, a second transmission (not shown) can be placed between the first transmission and the chipper 22 and truck drive wheels. The power takeoff is then located on the second transmission and is used to switch operation between the truck drive wheels and the chipper 22. The selection device for switching between vehicle drive and chipper drive is designed so that only one drive can be used at any one time. Preferably, as is known in the art, the selection device is an electric over air solenoid valve. When the device is energized, a first cylinder disengages the truck drive while a second cylinder engages the chipper drive. When the solenoid itself is de-energized, the first cylinder engages the truck drive and the second cylinder disengages the chipper drive.

To protect the truck engine, a special shut off device is used with the chipper 22 which cuts off the engine should the chipper 22 lock up or stall or if the chipper blades fall below is certain number of revolutions per minute (RPM) because of jamming wood pieces. Furthermore, the truck engine is equipped with a special heat sensing device, which also shuts off the engine should the truck engine become over heated due to abnormal workloads being placed on it or if the oil pressure drops below a certain level.

The chipper output from the engine drive is hooked to the chipper drive shaft by known means of a belt and pulley device. As is known in the art, a flat notched belt is used with a flat grooved transversely notched pulley. By using such a notched or timing chain like pulley the abnormal belt stretching typically produced by the chipper 22 is thereby avoided.

As is known in the art, the chipper 22 itself consists of a heavy-duty box-like housing, which is mounted to the chassis 14 in such a manner that the axis of the chipper drive is parallel to the truck drive axis. The drive shaft of the chipper 22 has a drum securely attached to it. The drum is located within the box-like housing and has attached to it a series of cutter blades which are arranged in rows parallel to the axis of the cutter shaft and with spacing between these cutters to accommodate anvils which are mounted on a semi-circular plate which conforms in shape generally to a cylinder defined by the outer edges of the rotating outer blades. This semi-circular plate is mounted below the blades of the drive cutters by attaching it to two ledge like projections, which project, from the sides of the housing. The semi-circular plate has holes at the bottom for allowing the chipped wood to pass into the chip transfer pipe 32 of the chipper 22.

A frame structure 24 is positioned over the compartment portion space 16, forming a platform 26 over the working compartment portion 18 and the storage compartment portion 20. The frame structure 24 may be constructed by one skilled in the art using known materials. A conventional cherry picker apparatus 28 is positioned centrally on the platform 26. Alternatively, the cherry picker apparatus 28 may be positioned on the dump bed portion 30 (not shown).

Figure 6:
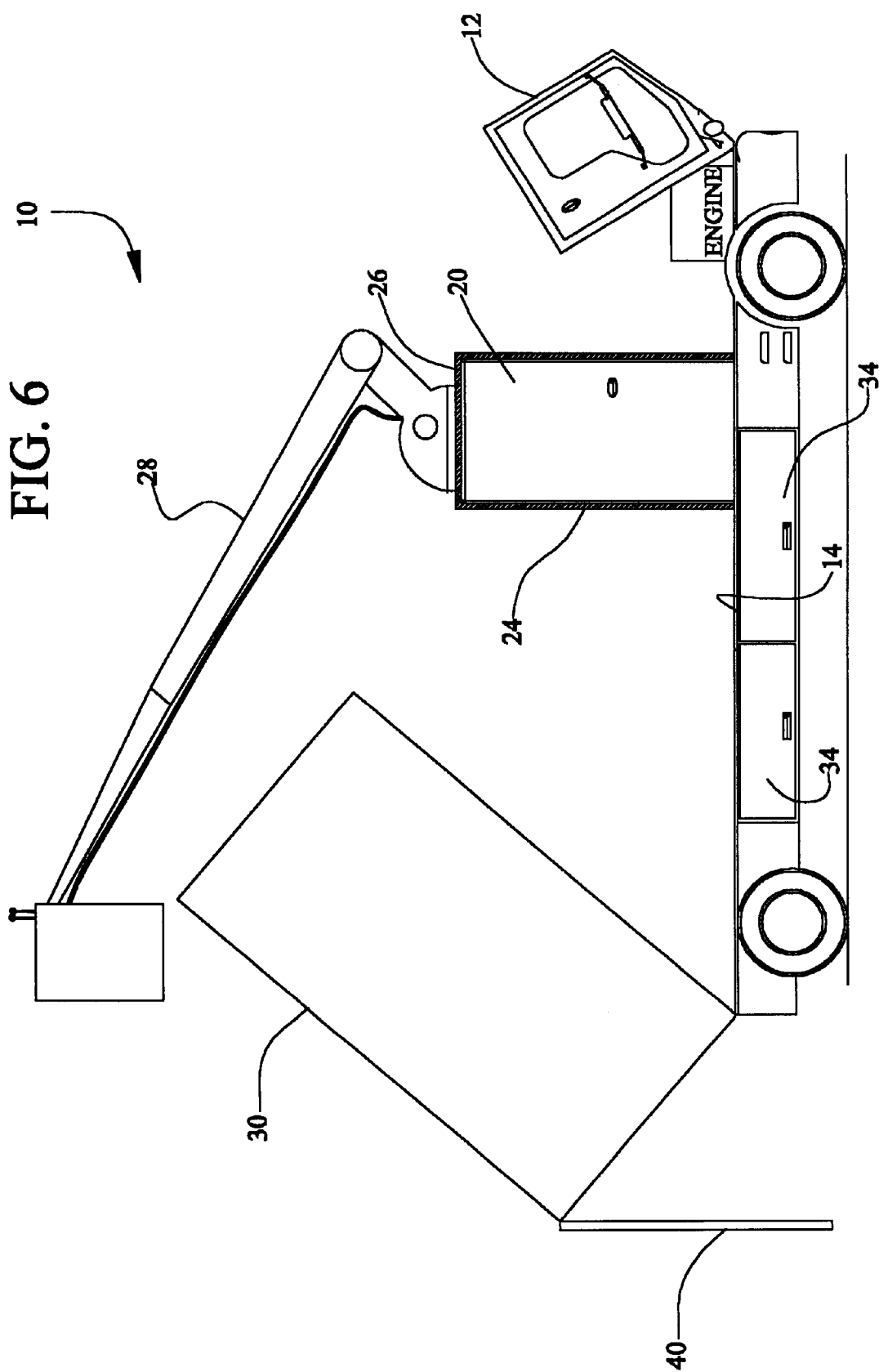
FIG. 6 is a side elevation of the mobile unitary highway chipper truck vehicle showing the easy accessibility to the chipper apparatus of the present invention.
Figure 7:
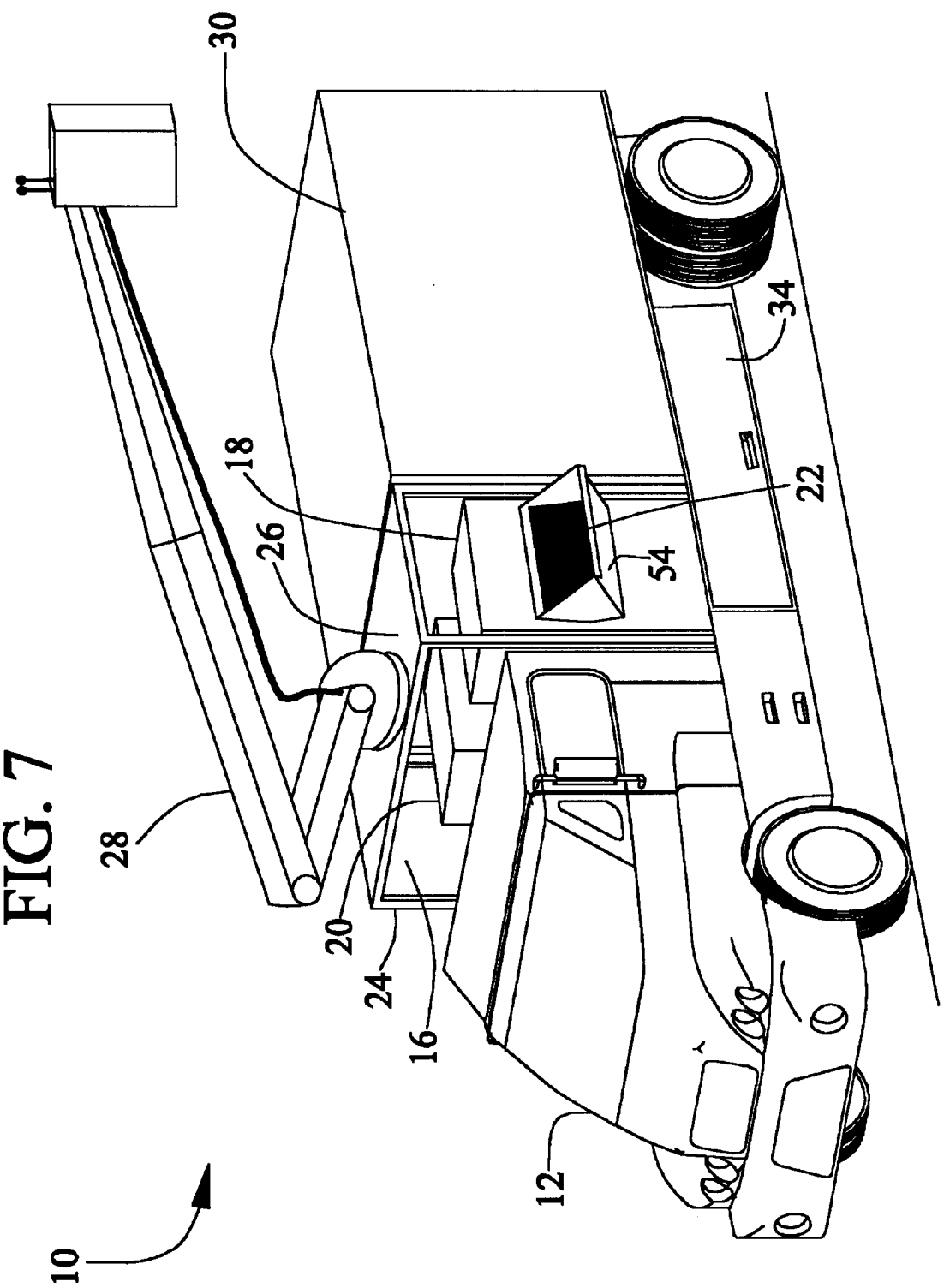
FIG. 7 is a side perspective view of the mobile unitary highway chipper truck vehicle of the present invention.
Figure 8:
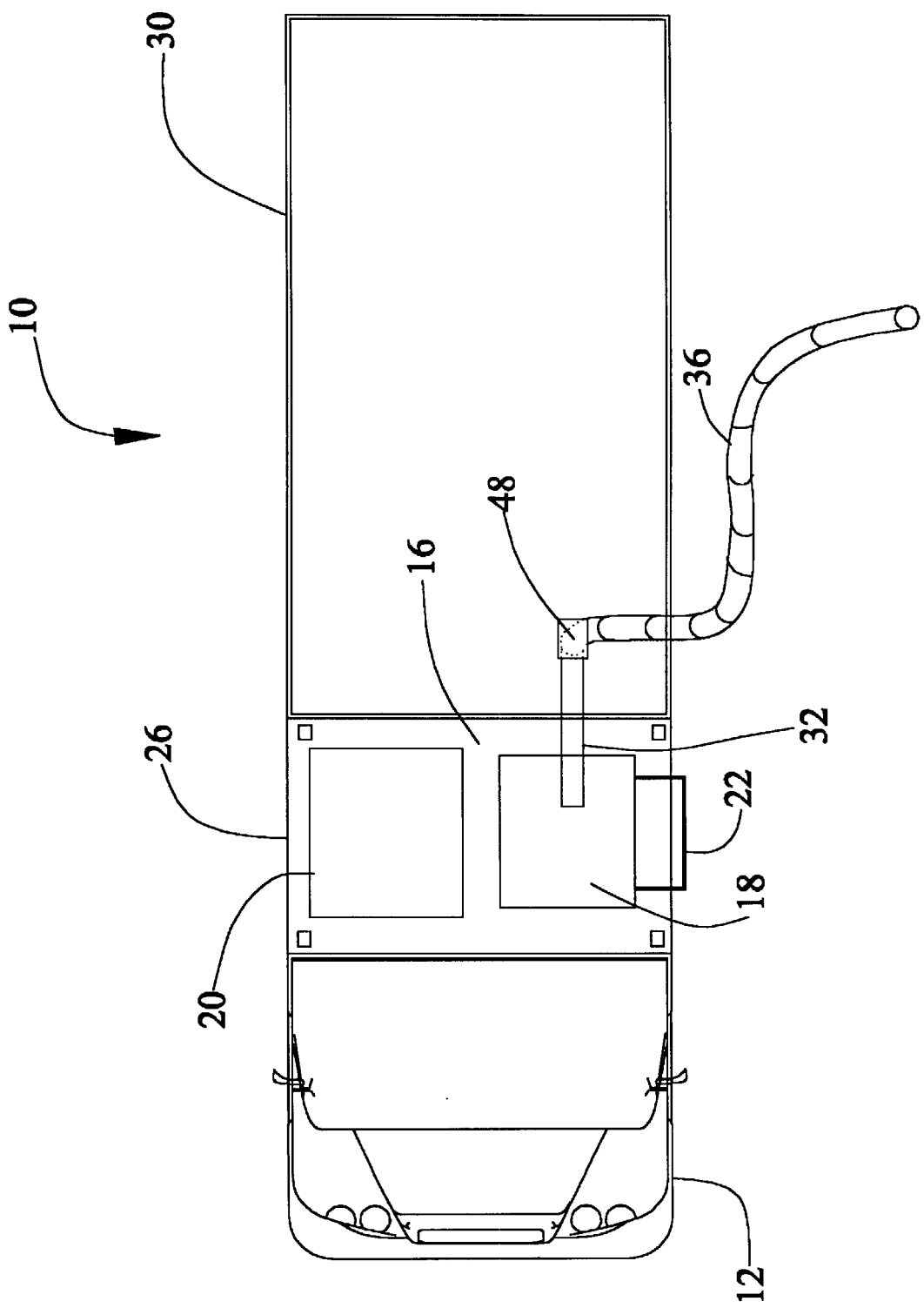
FIG. 8 is a top cross sectional view of FIG. 1 along line 8—8.

The backwardly pivotable dump bed portion 30 is located behind the compartment portion space 16 on the extended chassis 14. The backwardly pivotable dump bed portion 30 useful in the present invention is readily available from such sources as Mitsubishi Fuso Truck of America, Inc., Isuzu, Mack, Alumne and International. As shown in FIG. 6, the backwardly pivotable dump bed portion 30 includes a door 40 that opens when the backwardly pivotable dump bed portion 30 is raised in an upward and backward position. A means for discharging 32, or discharge conduit 32, or chip transfer pipe 32, utilizes the blow force of the chipping apparatus or chipper 22 to transfer chips into the backwardly pivotable dump bed portion 30 of the mobile vehicle 10. In a preferred embodiment, the backwardly pivotable dump bed portion 30 is fully enclosed. Alternatively, an open dump bed portion may be used, in which case the open bed may be advantageously covered with a protective net (not shown) for preventing chips coming from discharge conduit 32 from being hurled outside the backwardly pivotable dump bed portion 30. The chipper apparatus 22 is mounted by conventional means on the extended chassis 14 of the mobile vehicle 10. In preferred embodiment the extended chassis 14 of the mobile vehicle 10 is a conventional truck reinforced chassis.

As shown in FIG. 1, the mobile unitary highway chipper truck vehicle 10, may optionally include a means 44 for directionally discharging materials from the backwardly pivotable dump bed portion 30. The means 44 for directionally discharging materials is connected to the chip transfer pipe 32 by conduit 48. Conduit 48 is constructed of readily available materials. The means 44 for directionally discharging materials is detachably mounted with mounting brackets to cover a hole or aperture 50 that has been formed or cut out of the side of the backwardly pivotable dump bed portion 30. The means 44 for directionally discharging materials includes flexible hose 36. As is known by those skilled in the art, the flexible hose 36 can be of any convenient length and constructed of readily available materials. It is contemplated, and depending on the length of flexible hose 36, that the means 44 for directionally discharging materials may also include a conventional blower or fan device (not shown) to boost the discharge of materials exiting flexible hose 36.

Figure 2:
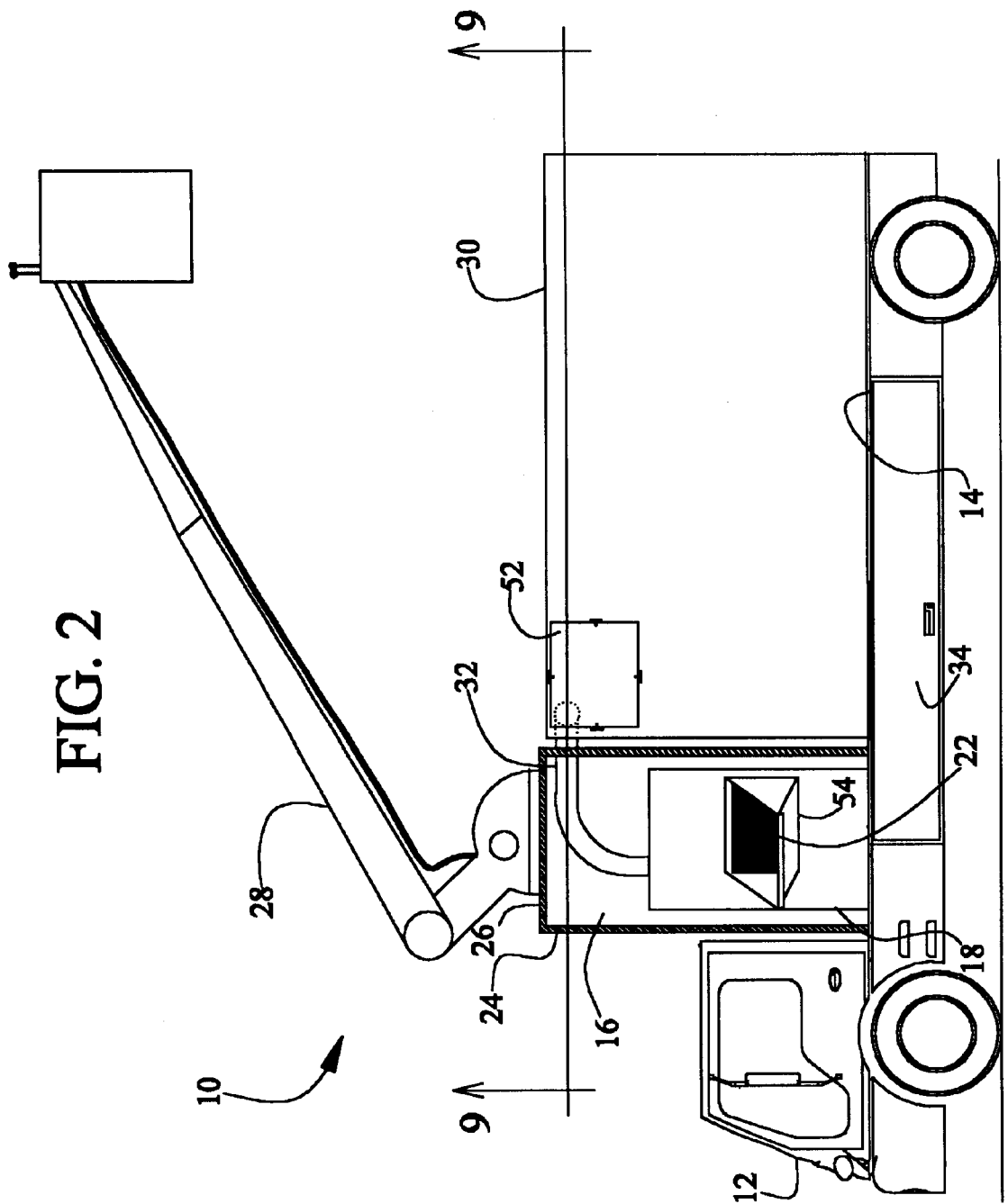
FIG. 2 is a side elevation of a further embodiment of the mobile unitary highway chipper truck vehicle of the present invention.

In the embodiment shown in FIG. 1, the materials that are being processed by chipper apparatus 22 are transported directly through chip transfer pipe 32 to conduit 48 through hole or aperture 50 and exit the unitary vehicle 10 through flexible hose 36. In an alternative embodiment, shown in FIGS. 2 and 4, the means 44 for directionally discharging materials has been removed from the unitary vehicle 10 and replaced with a detachably mounted cover plate 52.

Figure 3:
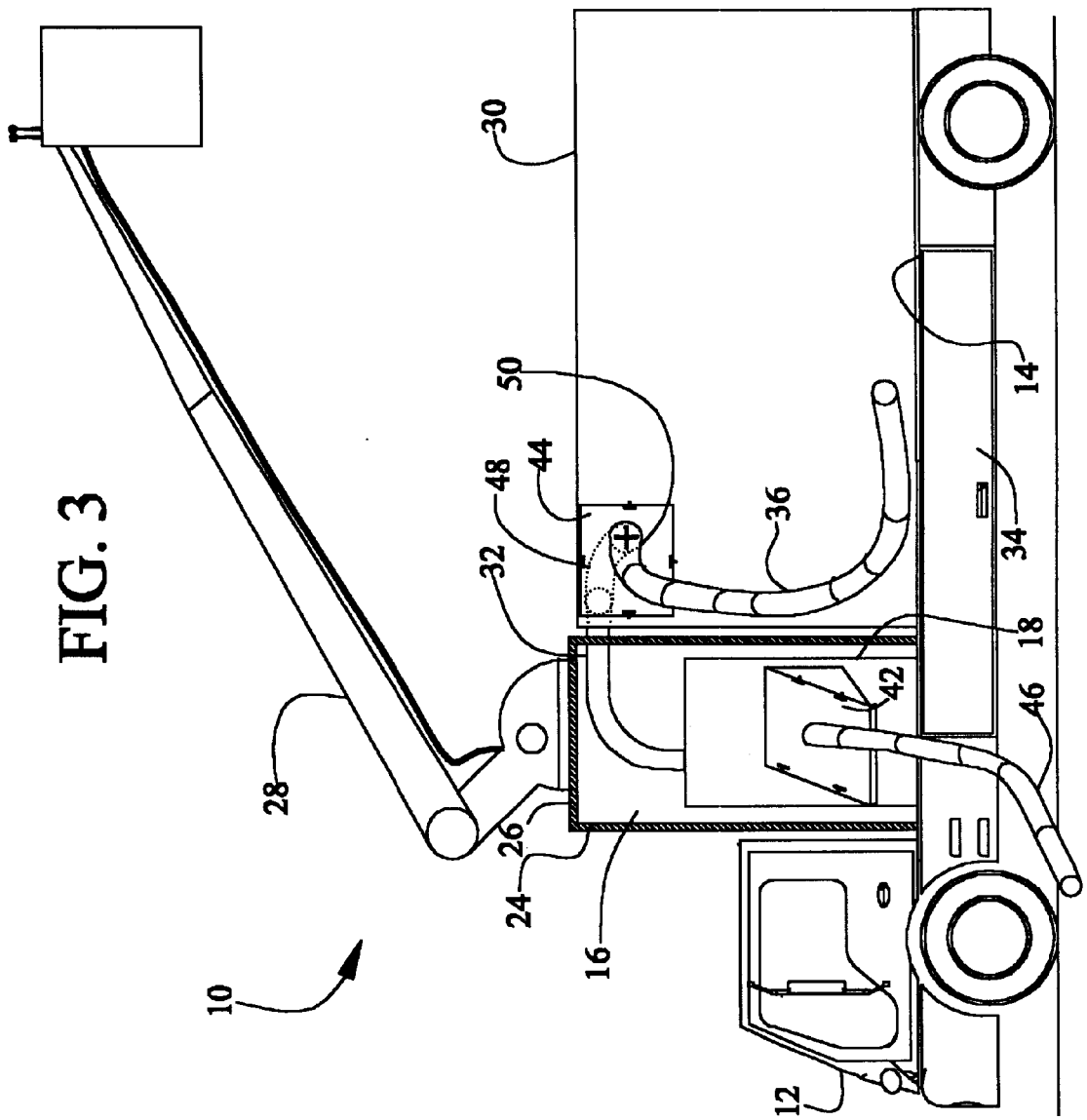
FIG. 3 is a side elevation of yet a further embodiment of the mobile unitary highway chipper truck vehicle of the present invention.
Figure 4:
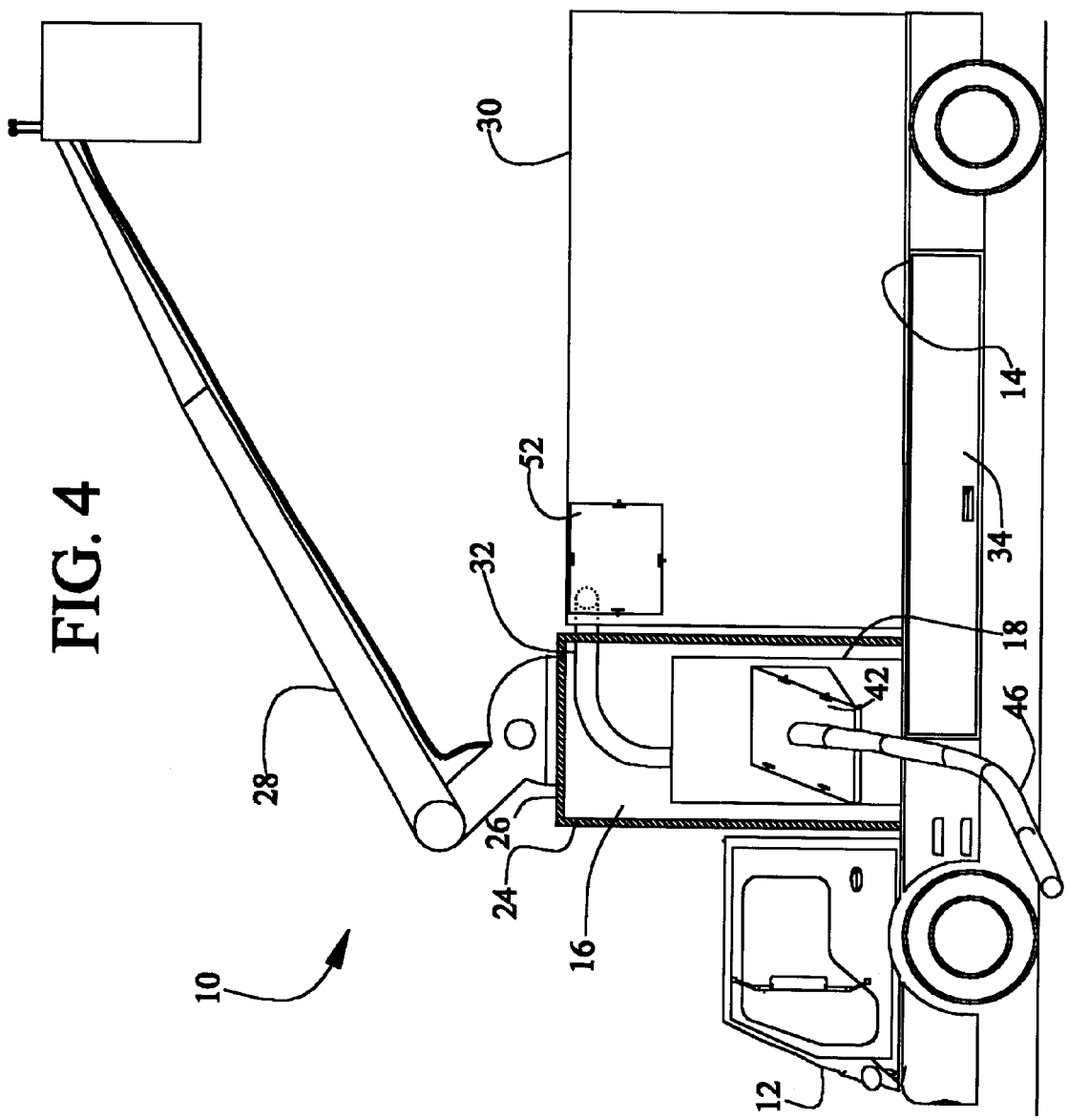
FIG. 4 is a side elevation of a further embodiment of the mobile unitary highway chipper truck vehicle of the present invention.
Figure 5:
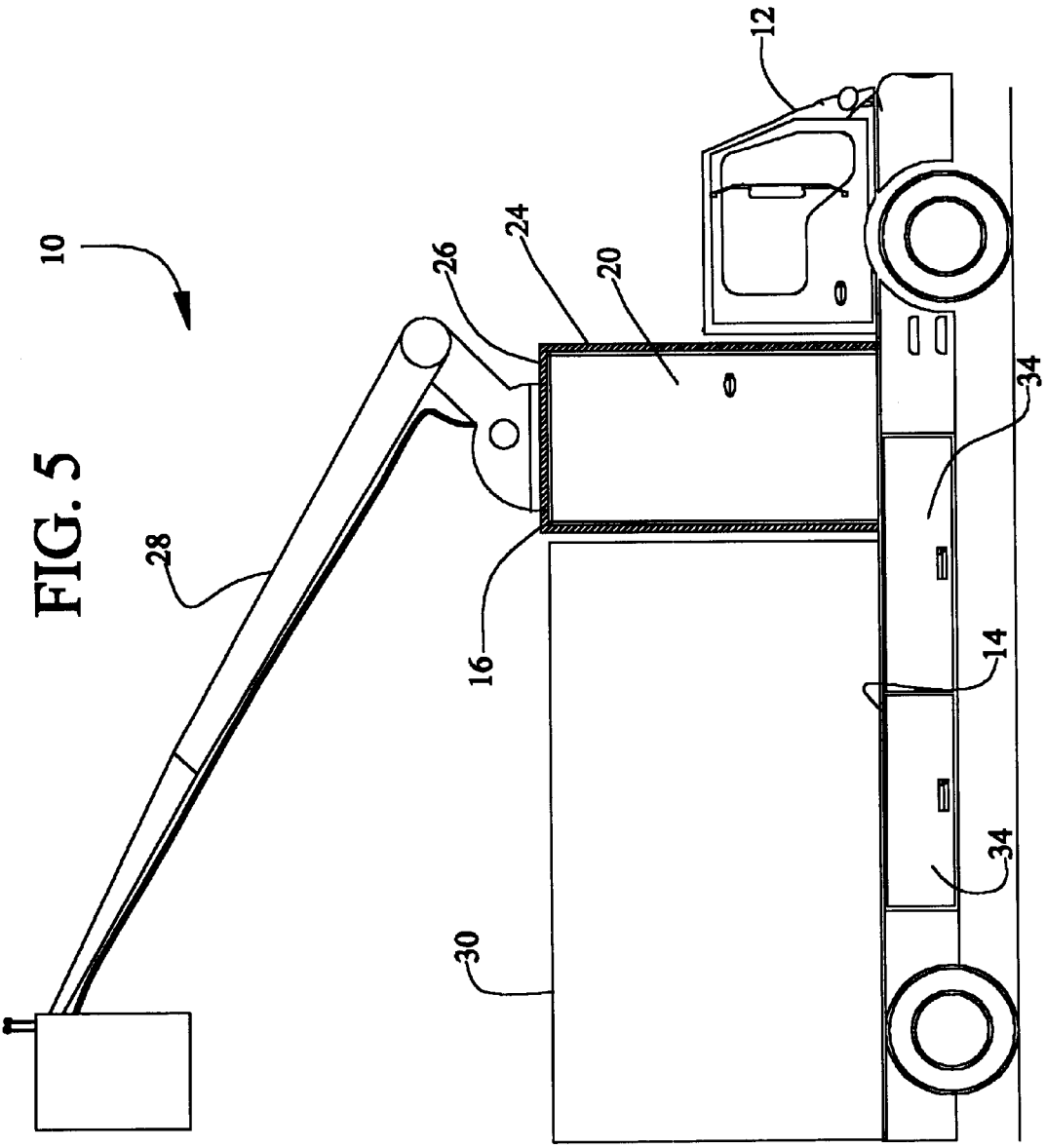
FIG. 5 is a side elevation of the opposite side of the mobile unitary highway chipper truck vehicle of the present invention shown in FIG. 1.

In a further embodiment, as shown in FIGS. 3 and 4, the mobile unitary highway truck vehicle 10, may optionally include a means 42 for removing debris and discharging the debris into the backwardly pivotable dump bed portion 30. The means 42 for removing debris is a vacuum apparatus attachment that is removably mounted over the feed hatch 54 of the chipper apparatus 22. The means 42 for removing debris includes hose 46.

The means 42 for removing debris and the means 44 for directionally discharging materials are commercially available from Bear Cat Company, Toro, Trac/Vac Company, and Billy Goat Company. Fitting these commercially available materials onto the unitary truck apparatus of the present invention is within the skill of the art.

As shown in FIGS. 1–7, storage box(es) 34 are located under the extended chassis 14. Lawn and tree trimming equipment are securely stored in storage box(es) 34. The storage box(es) 34 may be optionally provided with locking devices or mechanisms. It is contemplated that the accessories for the unitary vehicle will be stored in storage box(es) 34 when not in use.

Accordingly, a unitary vehicle that is inexpensive to purchase, maintain and operate is provided and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
what is claimed is:

1. A mobile unitary highway chipper truck vehicle comprising:

a forwardly pivotable cab portion;

an extended chassis;

a compartment portion of a predetermined width, height, and length located behind said cab portion on said extended chassis, said compartment portion including a working compartment portion and a storage compartment portion, said working compartment portion and said storage compartment portion located adjacent to each other in one of a side by side and back-to-back relationship;

a chipping apparatus housed in said working compartment portion of said compartment portion;

a frame structure positioned over said compartment portion, said frame structure including a platform above said working compartment and said storage compartment portions;

a cherry picker centrally positioned on said platform;

a backwardly pivotable dump bed portion located behind said compartment portion on said extended chassis;

means for discharging materials from said chipper apparatus into said backwardly pivotable dump bed portion; and at least one storage box located under said extended chassis.

2. The mobile unitary highway chipper truck vehicle according to claim 1 further comprising:

means for directionally discharging materials from said backwardly pivotable dump bed portion.

3. The mobile unitary highway chipper truck vehicle according to claim 1 further comprising:

means for directionally discharging materials from said chipper apparatus.

4. The mobile unitary highway chipper truck vehicle according to claim 1 further comprising:

means for removing debris and discharging said debris into said backwardly pivotable dump bed portion.

5. A mobile unitary highway chipper truck vehicle comprising:

a forwardly pivotable cab portion;

an extended chassis;

a compartment portion of a predetermined width, height, and length located behind said cab portion on said extended chassis, said compartment portion including a working compartment portion and a storage compartment portion, said working compartment portion and said storage compartment portion located adjacent to each other in one of a side by side and back-to-back relationship;

a chipping apparatus housed in said working compartment portion of said compartment portion;

a backwardly pivotable dump bed portion located behind said compartment portion on said extended chassis;

a cherry picker positioned on said backwardly pivotable dump bed portion;

means for discharging materials from said chipper apparatus into said backwardly pivotable dump bed portion; and at least one storage box located under said extended chassis.

6. The mobile unitary highway chipper truck vehicle according to claim 5 further comprising:

means for directionally discharging materials from said backwardly pivotable dump bed portion.

7. The mobile unitary highway chipper truck vehicle according to claim 5 further comprising:

means for directionally discharging materials from said chipper apparatus.

8. The mobile unitary highway chipper truck vehicle according to claim 5 further comprising:

means for removing debris and discharging said debris into said backwardly pivotable dump bed portion.

* * * * *